R. H. EDMUNDS, Jr.
Gage for Tobacconists.

No. 197,839.  Patented Dec. 4, 1877.

— FIG. I —  — FIG. II —

| 8 inch | | 9 inch | | 10 inch | | 11 inch | | 12 inch | |
|---|---|---|---|---|---|---|---|---|---|
| Quantity | Price | Quantity | Price | Quantity | Price | Quantity | Price | Quantity | Price |
| c | | c | | c | | c | | c | |
| | | a | | a | | a | | a | |
| | | | | 25 | 25 | | | | |
| | | | | | | 30 | 35 | 20 | 25 |
| | | 20 | 20 | | | 20 | 25 | 30 | 40 |
| 15 | 15 | | | 20 | 25 | 25 | 35 | | |
| | | | | | | | | 25 | 40 |
| | | 20 | 25 | | | 20 | 25 | 15 | 25 |
| | | 15 | 20 | 10 | 15 | 10 | 15 | 30 | 50 |
| | | | | | | 15 | 25 | 20 | 35 |
| 15 | 20 | 10 | 15 | 15 | 25 | 20 | 35 | 20 | 40 |
| 10 | 15 | 15 | 25 | | | 15 | 30 | | |
| | | | | | | | | 15 | 35 |
| | | 10 | 20 | | | 15 | 35 | 10 | 25 |
| | | | | | | 10 | 25 | 20 | 50 |
| 10 | 20 | | | 10 | 25 | | | 15 | 40 |
| 5 | 10 | 10 | 25 | | | 10 | 30 | | |
| | | | | 5 | 15 | 5 | 15 | 10 | 35 |
| | | 5 | 15 | | | 10 | 35 | 10 | 40 |
| 5 | 15 | | | | | | | | |
| | | 5 | 20 | | | 5 | 25 | 5 | 25 |
| 5 | 20 | | | 5 | 25 | | | 10 | 50 |
| | | 5 | 25 | | | 5 | 30 | 5 | 35 |
| | | | | | | 5 | 35 | | |
| | | | | | | | | 5 | 40 |

B

WITNESSES:  
Frank M. Burnham  
F. E. Hewlett

INVENTOR:  
Robert H. Edmunds Jr.  
by W. T. Howard  
attys.

UNITED STATES PATENT OFFICE.

ROBERT H. EDMUNDS, JR., OF RIDGEWAY, SOUTH CAROLINA.

IMPROVEMENT IN GAGES FOR TOBACCONISTS.

Specification forming part of Letters Patent No. 197,839, dated December 4, 1877; application filed October 4, 1877.

*To all whom it may concern:*

Be it known that I, R. H. EDMUNDS, Jr., of Ridgeway, in the county of Fairfield and State of South Carolina, have invented an Improved Gage for Tobacconists, of which the following is a specification, reference being had to the accompanying drawings, and to the letters of reference marked thereon.

This invention is designed for the use of tobacconists or dealers in plug-tobacco; and consists in a board, having on it a combination of words, lines, and numbers arranged in a manner indicating to the seller the amount of plug-tobacco to be given to the buyer for a certain price, as hereinafter fully explained.

It is well known to tobacconists and other dealers in plug-tobacco that it is difficult by guess-work to at all times proportion the amount of tobacco given to the price paid by the buyer, and that in many cases either the seller is underpaid for the amount of the commodity given to the buyer, or that the latter obtains less than he is entitled to receive. Thus, in the end, much loss occurs, generally to the seller, which loss is prevented by the use of my improvement.

In the accompanying drawings, Figure 1 is a face view of the invention, and Fig. 2 is an edge view of the same.

A is the board, which may be made of any suitable material. The upper part is provided with the numbers 8, 9, 10, 11, 12, which indicate the different lengths of plug-tobacco ordinarily sold. Thus, the number 10 indicates what is known as "10-inch tobacco." The numbers 8, 9, &c., are separated from each other by lines *a a*, and immediately below each of said numbers is the word "inch." Below the words "inch" is a heavy line, *b*, and a short distance below said line a second similar line, *b'*. The longitudinal divisions, headed by the numbers 8, 9, &c., are divided centrally by lines *c c c*, making each of said divisions to consist of two longitudinal spaces, in one of which, between the lines *b* and *b'*, is the word "quantity," and in the other the word "price." Each division, headed by a number and longitudinally divided into two sections by the lines *c c c*, is supplied with numbers, as shown, and lines below each pair of said numbers, one number being in each case under the word "quantity" and the other under the word "price." Thus, taking the division under the number 11, and casting the eye down said division, it will meet, near the center of the board, the numbers 15, 25.

Supposing a person calls on the dealer for fifteen cents' worth of eleven-inch tobacco, the price of the whole plug (eleven inches) being twenty-five cents, the dealer applies the bottom of the plug to the base-line B, and the distance therefrom to the figures 15, 25 is the length of the plug of tobacco to be cut off and sold, and would necessarily leave ten cents over to be retained by the dealer.

The numbers throughout are arranged in a similar manner, in all cases the quantity of a certain-priced tobacco to be given for a certain amount being indicated at a mark, which also indicates the price of the whole plug, and, on subtracting the lesser number from the greater, the remainder indicates the price of the portion of the plug remaining in the dealer's hands.

This device may be used in connection with the well-known tobacco-cutter in use by most tobacconists.

Having described my invention, what I claim as new, and wish to secure by Letters Patent of the United States, is—

As a new article of manufacture, a tobacconist's gage, consisting of a board having divisions, headed by numbers, indicating the various numerals by which plug-tobacco is known, and also numbers in pairs, one of which numbers indicates the price of the whole plug, and the other the price of a certain portion thereof, the said pairs of numbers being placed at specified distances from a common base-line, and arranged so that the difference between the two indicates the cost of the portion of the plug not sold, as specified.

In testimony whereof I have hereto subscribed my name in the presence of two subscribing witnesses this 31st day of August, A. D. 1877.

ROBERT H. EDMUNDS, JR.

Witnesses:
JOHN A. DESPARTES,
SAMUEL L. DIXON.